(12) United States Patent
Kurtz et al.

(10) Patent No.: US 8,061,213 B2
(45) Date of Patent: Nov. 22, 2011

(54) HIGH TEMPERATURE, HIGH BANDWIDTH PRESSURE ACQUISITION SYSTEM

(75) Inventors: Anthony D. Kurtz, Saddle River, NJ (US); Alexander A. Ned, Kinnelon, NJ (US); Joseph Van DeWeert, Maywood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 255 days.

(21) Appl. No.: 12/321,521

(22) Filed: Jan. 22, 2009

(65) Prior Publication Data

US 2010/0185403 A1    Jul. 22, 2010

(51) Int. Cl.
*G01L 9/06* (2006.01)
(52) U.S. Cl. ............................................. 73/721; 73/727
(58) Field of Classification Search ........................ None
See application file for complete search history.

(56) References Cited

U.S. PATENT DOCUMENTS

| | | | |
|---|---|---|---|
| 3,930,412 | A | 1/1976 | Mallon et al. |
| 4,192,005 | A | 3/1980 | Kurtz |
| 4,399,515 | A | 8/1983 | Gross |
| 4,946,010 | A | 8/1990 | DiBono |
| 5,506,794 | A | 4/1996 | Lange |
| 5,955,771 | A | 9/1999 | Kurtz et al. |
| 2007/0107523 | A1 * | 5/2007 | Galewski ................ 73/754 |
| 2007/0151347 | A1 | 7/2007 | Maitland, Jr. et al. |
| 2009/0272206 | A1 * | 11/2009 | Stumpf .................. 73/866.5 |
| 2010/0274447 | A1 * | 10/2010 | Stumpf .................. 701/36 |

OTHER PUBLICATIONS

Australian International Search Report and Written Opinion dated Feb. 15, 2011 for related PCT Application No. PCT/US2010/021733.

* cited by examiner

*Primary Examiner* — Andre J Allen
(74) *Attorney, Agent, or Firm* — Troutman Sanders LLP; James E. Schutz; Jihan A. R. Jenkins

(57) ABSTRACT

A system for measuring a multiplicity of pressures as those experienced by a model in a wind tunnel is depicted. The system includes individual sensor devices which are connected to an Acquisition and Compensation electronics module. The individual sensor or transducer devices are semiconductor piezoresistive devices and are connected to the Acquisition and Compensation electronics module by means of a cable in a first embodiment. In an alternate embodiment the system uses connectors which connect each of the individual sensor devices to the Acquisition and Compensation electronics module via a mating connector located therein. The connectors may also include a memory which stores compensation coefficients associated with each of the various sensor devices. In this manner as described, the transducers which are small devices are connected via electrical lines or cables to the central Acquisition and Compensation electronics modules. This module houses electronics which digitally converts the data from the sensors and then compensates the data for temperature effects. The advantage of the system is that each individual sensor does not have any compensation and it can be made very small to operate at very high temperatures without any loss of accuracy. Thus, a large number of sensors can be utilized in a very small volume, even under extreme environmental conditions. It is noted that the Acquisition and Compensation electronics module can be located remotely in a safe environment outside of the wind tunnel and therefore respond extremely accurately to the pressure and temperatures subjected by the model in the wind tunnel.

15 Claims, 3 Drawing Sheets

HIGH TEMPERATURE, HIGH BANDWIDTH PRESSURE ACQUISITION SYSTEM

FIELD OF THE INVENTION

The present invention relates to pressure transducer systems and more particularly to a system for measuring multiple pressures under severe conditions.

BACKGROUND OF THE INVENTION

There is a need in many applications for measuring a set of pressures or multiple pressures along a given surface. These measurements, for example, are made in a wind tunnel where sensors may be placed on the wing of an airplane at different locations. The wind tunnel subjects the model, such as the wing of an airplane or other model, to extreme temperatures, vibrations and high wind velocity. A common method, which is employed, is to use a pressure scanner. Such a scanner essentially is a small box with a number of pressure sensors inside. Tubes are run from the pressure surface to the scanner in order to measure the pressure. As one can ascertain, such a device is depicted in U.S. Pat. No. 3,930,412 issued on Jan. 6, 1976 to A D Kurtz, et al. and entitled Electrically Scanned Pressure Transducer Configurations. That patent which is assigned to Kulite Semiconductor Products, Inc., the assignee herein. There is shown a plurality of individual pressure transducers which are mounted or fabricated within a common housing. Each pressure transducer is associated with a separate and distinct pressure port and can be subjected to a different one of a plurality of pressure sensitive locations to be monitored. The pressure transducers are electrically scanned by means of a scanning device such as a shift register or counter so that their individual outputs can be recorded. If one makes reference to the above-noted patent, one will see that the discussion of wind tunnel measurements is given and various other publications which are pertinent to such a scanner are also depicted.

While the scanner has been utilized, the disadvantages are that the response rate of such a system is greatly lowered because of the fact that long tubes must be run from the scanner module to various points along the wing of an aircraft. As one can ascertain, the wing of an aircraft could be extremely long and therefore the pressure tubes that are directed from the pressure scanner are long and therefore is very difficult to get frequency data more than a few tens of hertz. In any event, as depicted from the above-noted patent, it has the advantage of being a compact system and does not require a great deal of cabling from the scanner to the outside computer system.

Another method of measuring the pressure along a surface is to place individual pressure sensors at each measurement point. The output of each of these sensors is then directed back to a central data acquisition system. This configuration has the advantage of allowing high frequency data to be taken but it makes the measurement much more complicated because the output from each pressure sensor must be digitally converted and electrical lines must be run from the sensor to a central data acquisition system. This also requires a great deal of time installing the system as well as retrieving the data from the system. In any event, based on the above, it is a object of the present invention to provide a pressure system for measuring a multiplicity of pressures as in a wind tunnel, each under extreme conditions of temperature and vibration and to enable the system to be simply implemented and maintained.

SUMMARY OF THE INVENTION

Apparatus for measuring a plurality of pressures, comprising: a plurality of sensor devices, each capable of providing an output voltage indicative of an applied pressure, with each output voltage having a unique error voltage due to undesirable variations with temperature and pressure, an electronic assembly including multiple inputs each for receiving an associated output sensor voltage via a single cable from said associated sensor to said associated electronic assembly input, a memory having a plurality of storage locations, with each location associated with an associated sensor device for storing therein compensation values indicative of said error voltage and associated with said associated sensor, and processing means located in said electronic assembly and responsive to said sensor output voltages and said stored components for providing outputs indicative of each sensor output voltage as compensated by said stored components.

DETAILED DESCRIPTION OF THE INVENTION

Figure 1:
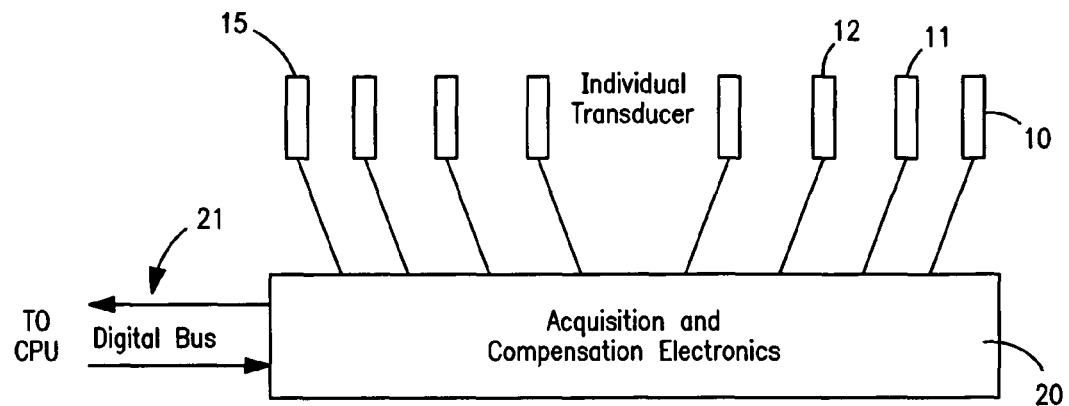
FIG. 1 is a simple block diagram depicting the pressure acquisition system according to this invention

Referring to FIG. 1, there is a depicted a simple block diagram of a pressure system according to the present invention. As seen in FIG. 1, individual transducers such as 10, 11, 12 and 15 are connected via electrical lines or cables to a central module 20. The module 20 designated as an Acquisition and Compensation electronics 20, and receives multiple inputs from the pressure sensors as 10, 11, 12 and 15. The pressure sensors, each as indicated, are individual transducer assemblies and are positioned on various points along the model to be tested. As indicated above this may be an aircraft wing or some other object which is placed in a wind tunnel. The Acquisition and Compensation electronics digitally converts the data from the transducers and then compensates the data for various temperature effects. The data from each of the sensors, as 10, 11 and so on, can then be sent on a digital bus 21 to a central computer. An advantage of the present system, as will be further explained, is that because each individual sensor does not have any compensation they can be made very small and made to operate at high temperatures without any loss of accuracy. In this manner, a large number of sensors, as 10-15, can be used in a small volume even under extreme environmental conditions. The electronics can be mounted in close vicinity but in a much safer environment. It is of course desirable to utilize a sensor which can be subjected to high vibrational applications and such a sensor, for example is described in U.S. Pat. No. 5,955,771 issued on Sep. 21, 1999 to A D Kurtz et al. and assigned to the assignee herein. That patent depicts an hermetically sealed sensor device which has a glass member defining a mounting surface and a base surface. The glass member includes one or more pin apertures extending through the glass member from the mounting surface to the base. A metallic pin is disposed in each of the pin apertures. The sensor device includes a semiconductor sensor chip, including a semiconductor device and a cover which is bonded and sealed to a surface of the semiconductor device to protect the device from the external environment. As indicated, the chip is hermetically bonded and sealed to the mounting surface of the glass member. The semiconductor device has one or more contacts disposed on the surface and for making electrical contact to the device. The portion of each pin extending above the mounting surface is received within the contact apertures and a conductive glass frit is disposed in the contact apertures. This structure provides a hermetically sealed sensor device which is capable of high temperature operation and capable of withstanding high vibrational modes. As indicated, the above-noted U.S. Pat. No. 5,955,771 is incorporated herein in its entirety and as indicated again, such a sensor can be used for sensors depicted as 10, 11, 12 and 15 of FIG. 1.

Figure 2:
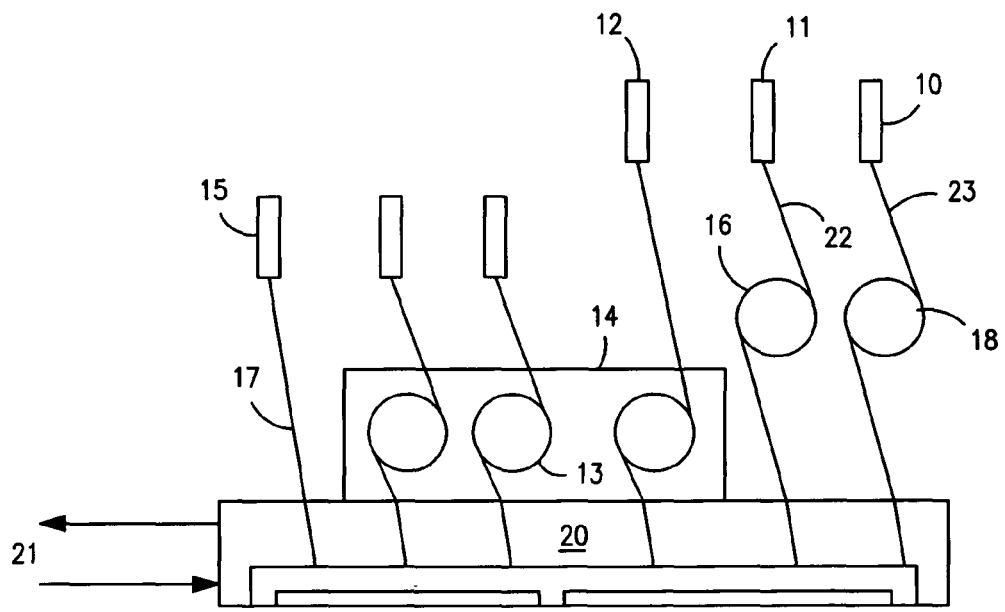
FIG. 2 is a block diagram depicting an embodiment of the present invention.

Referring to FIG. 2, there is shown a first embodiment of the present invention. In regard to FIG. 2, the transducers as 10, 11, 12 and 15 are permanently fixed to the electronic assembly 20 so that each transducer is assigned a fixed channel number in the electronics. In this way the coefficients for digital correction are programmed into the electronics and stored there permanently. Both the pressure output and the temperature of the individual sensors is detected through the measurement of the common mode voltage and the differential output voltage. These measurements are well known and depicted in the prior art. The transducers or sensors such as 10, 11 and 12 can be attached via cables of whatever length may be suitable for the application. For example, sensor 15 is coupled via cable 17 to module 20. To make the cabling neater and to avoid tangles, one can utilize a spring loaded reel device such as reel device 13, 16 and 18. Such reel devices are well known and would allow for automatic retraction of the transducers when not in use. As seen, the reel devices associated with each transducer can be positioned in the housing 14 or can be positioned in the Acquisition and Compensation electronics module 20. In any event, it is shown that reel 13 is positioned within housing 14 while reel 16 and 18 are shown outside. It is of course understood that any location of the various reels can be employed. Thus as seen in FIG. 2, each of the transducers is directly wired to the Acquisition and Compensation electronic module or housing 20, which again, interfaces with a digital output bus 21 which again goes to a central computer or other location.

Figure 3:
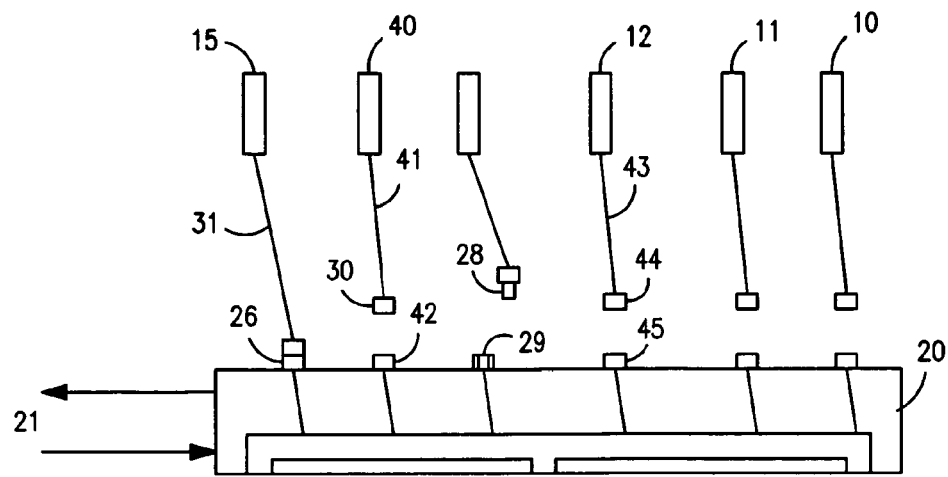
FIG. 3 is a block diagram depicting an alternate embodiment of the present invention.

Referring to FIG. 3, it is shown that each transducer as 10, 11, 12 and 15 is connected to the Acquisition and Compensation electronics module 20 via a cable with a connector on the end. Thus transducer 15 is connected via a cable 31 to a connector module 26. Transducer 40 is connected via cable 41 to a connector 30 which is associated with a mating connector receptacle 42. As can be seen, each of the transducers as 10, 11, 12 has a connector at the end of the cable which is associated with a mating connector on the housing 20. Thus sensor 12 has a cable 43 which is directed to a male or female connector 44, which mates with a connector 45, which connector 45 is mounted on the module 20. In this manner, each of the sensors or transducers is connected to the main module 20 via an associated cable with a connector on the end.

Figure 4:
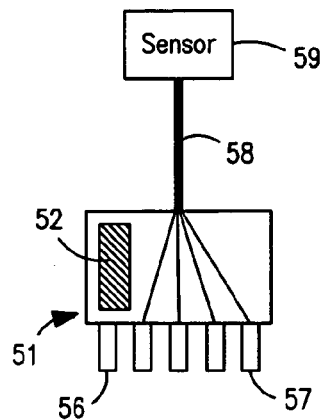
FIG. 4 is a schematic depiction of a connector configuration employed with the present invention.

Referring to FIG. 4, there is shown another way of combining a sensor or transducer with the electronic module 20. This would allow for any transducer to be plugged into any channel. As seen in FIG. 4, a small memory chip 52 is added to the connector on each transducer. Thus as seen, the connector 51 has the memory chip 52 connected thereto, connector 51 has output pins such as 56 to 57, while the cable 58 goes to the sensor which is the transducer 59. The memory chip, for example, may be a small memory such as an EEPROM. The coefficients for correction are stored in the transducer. The digital electronics can then read these coefficients and use them for digital correction. This can be done by software which the user would program in the correct coefficients for each transducer after all the connections are made. Thus the EEPROM or memory 52 stores the coefficients associated with the sensor 59. In this manner, when sensor 59 is plugged into a connector of the electronic module 20, it automatically has all the coefficients stored in memory 52. Thus the connector 51 can be inserted into any matching connector on the electronic module assembly 20. Thus as seen from FIG. 4, the sensor 59 can be inserted into connector 42, 29 or 45 of FIG. 3 and the coefficients as stored in the memory 52 would always be available to the electronic module 20 and be definitive of transducer 59.

Figure 5:
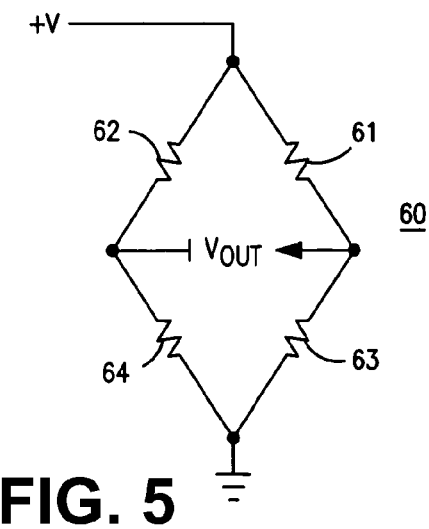
FIG. 5 is a schematic diagram of a pressure sensor bridge circuit used in this invention.

Referring to FIG. 5 there is shown a simple sensor configuration. A typical sensor, which may be a full bridge includes four piezoresistors as 61, 62, 63 and 64. The piezoresistors are semiconductor resistors which may be diffused or otherwise located on a thin silicon or other diaphragm. The diaphragm will flex upon application of a force thereto. In this manner, the piezoresistive devices are force or pressure sensitive and the resistances vary according to the force applied to the active area of the diaphragm. Such configurations are extremely well known. In any event, as seen in FIG. 5, the bridge configuration 60 depicted, will have various attributes or error values concerning temperature variation as well as variations in applied pressure over temperature ranges and so on. These coefficients involving temperature and pressure are stored in the EEPROM 52 for each of the sensors as sensor 59 and 60. It is also understood that each sensor can have its coefficients separately stored in memory. The compensation of such sensors regarding the prior art is well known and the assignee has patents showing compensation of sensors for temperature and pressure. Reference is made to U.S. Pat. No. 4,192,005 entitled Compensated Pressure Transducer Employing Digital Processing Techniques issued on Mar. 4, 1980 to A D Kurtz and assigned to Kulite Semiconductor Products, Inc., the assignee herein. That patent is the first early showing of a semiconductor sensor configuration which employs piezoresistors in a bridge configuration. The patent depicts a memory, which has stored therein, predetermined values indicative of error voltages associated with the particular bridge circuit due to undesirable variations of temperature and pressure. The bridge circuit is coupled to digital processing circuitry which serves to access the memory at desired locations to retrieve the values stored and to process these values in order to compensate the output signal supplied by the bridge during operation. This provides a compensated output signal truly determinative of the applied pressure as being compensated for the particular error signals associated with the semiconductor sensor configuration and as stored in the memory. Thus as one can ascertain, the same processing technique can be employed together with this invention where in one embodiment, for example, the error voltages associated with the particular bridge circuit due to variations of temperature and pressure are stored in the electronic module 20. In another example, these error signals would be stored in the memory 52 associated with the connector 51 as depicted in FIG. 4. Thus by being able to attach the sensors directly to the surface of the model, such as the wing of the aircraft and so on, it would be possible to take high accuracy measurements without sacrificing temperature or frequency response. The sensors can operate at temperatures in excess of a thousand degrees F, and the electronics can be located remotely and one can still receive the detailed information about the aerodynamics of the surfaces being tested as well as the apparatus being tested.

Figure 6:
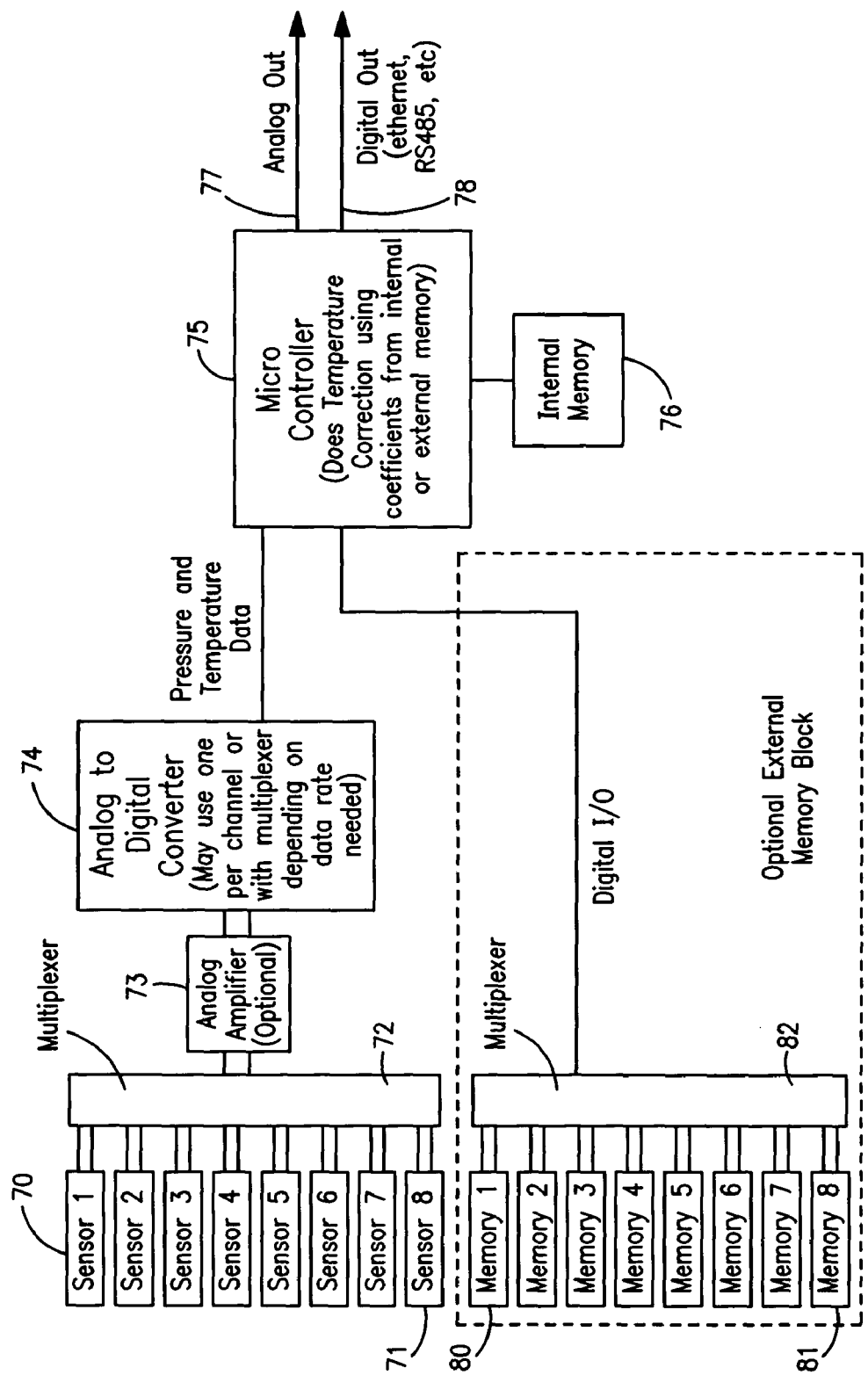
FIG. 6 is a block diagram of the Acquisition and Compensation electronics module employed with the present invention.

Referring to FIG. 6 there is shown a block diagram of the high temperature, high bandwidth pressure acquisition system according to this invention. As seen in FIG. 6, there are a plurality of sensors, 70 to 71. These sensors, for example, are piezoresistive Wheatstone bridge configurations as shown in FIG. 5. In any event, each of the sensors has an output connected to a multiplexer as 72. The multiplexer 72 as is well known, can select the output of any sensor according to the multiplexing frequency. The multiplexer 72 can be controlled in operation by the microcontroller 75. As seen in FIG. 6, the output of the multiplexer 72, which is the sensor multiplexer can be coupled to an analog amplifier 73. This analog amplifier 73 is optional and depends upon the voltage output levels of the sensor assemblies. In any event, the analog output obtained from the multiplexer indicative of the output of each of the sensors is now converted into a digital signal via an analog to digital converter 74. One can use one analog to digital converter per channel or use it with the multiplexer 72 depending on the data rate needed. In any event, the output of the A-to-D converter provides pressure and temperature data regarding each sensor. This data is applied to a input bus of a microprocessor or microcontroller 75 which has its own internal memory 76. Also shown are plurality of memories as 80 to 81. Each memory, for example as memory 80 is associated with a sensor as 70 while memory 81 for example, is associated with sensor 71. The memory contains the error coefficients for each of the various sensors. While the memories are shown separately, it is understood that the memories can be located in memory 76 associated with the microcontroller 75. The microcontroller of course determines which sensor is being scanned and therefore can go to a memory location whereby the error voltages or compensation coefficients are stored for that particular sensor. In any event, to make matters simple it is shown that there is memory associated with each sensor and the output of the memories are directed via multiplexer 82. Therefore, when sensor 70 is being scanned, the output from memory 80 is directed to the microcontroller 75. The microcontroller 75 operates to compensate each of the sensors according to the error coefficients as determined and as stored in the various memory modules. It is of course understood, that the memory block as shown in FIG. 6 may be incorporated in the internal memory 76 of the microcontroller 75 or for example, each of the memory modules as 80 and 81 can be stored in a connector (FIG. 4) and therefore directed to the electronics. The microcontroller, as indicated provides temperature correction using coefficients from the memory of the microcontroller 76 or from the external memory as memories 80 and 81 associated with multiplexer 82. The compensation, as indicated, is described in detail in the above noted patent, namely U.S. Pat. No. 4,192,005. It is further understood that various other compensation techniques can be employed. As shown, the microcontroller 75 has an analog output 77 which provides the analog output associated with each sensor. The microcontroller can also convert the digital information received from the analog to digital converter 74 to a different form of digital output to be compatible with various digital circuitry such as the Ethernet or other digital formats. It is of course understood that the output of the analog to digital converter 74 is a digital signal which can be further processed by the microcontroller to provide another digital output on the digital bus 78. The microcontroller can also take the digital output from the analog to digital converter 74 and convert it to an analog output after compensation of temperature coefficients. It is thus seen that the above noted system enables one to make multiple pressure measurements in a rapid manner. The major aspect of the present invention is being enabled to attach the sensors directly to a surface model and to make high accuracy measurements without sacrificing response in temperature or frequency.

It should therefore be apparent to one skilled in the art that there are many embodiments of the present invention that can be ascertained and which employ alternate structure. Thus for example, one can employ a special digital circuit in lieu of microprocessor and can combine the functions of the multiplexers utilizing other scanning techniques. It is therefore deemed that all such alternate embodiments be encompassed within the spirit and scope of the claims appended hereto.

What is claimed is:

1. Apparatus for measuring a plurality of pressures, comprising:
   a plurality of sensor devices, each providing an output voltage indicative of an applied pressure, with each output voltage having a unique error voltage due to undesirable variations with temperature and pressure,
   an electronic assembly including multiple inputs each for receiving an associated output sensor voltage via a single cable from said associated sensor to said associated electronic assembly input,
   a memory having a plurality of storage locations, with each location associated with an associated sensor device for storing therein compensation values indicative of said error voltage and associated with said associated sensor, and
   processing means located in said electronic assembly and responsive to said sensor output voltages and said stored components for providing outputs indicative of each sensor output voltage as compensated by said stored components.

2. The apparatus according to claim 1 wherein said sensor is a piezoresistive semiconductor sensor.

3. The apparatus according to claim 2 wherein each sensor is a Wheatstone bridge array.

4. The apparatus according to claim 1 wherein said single cable is coupled to a spring loaded reel device for allowing automatic retraction of the sensor when not in use.

5. The apparatus according to claim 1 wherein each single cable is connected to a connector, with said electronic assembly having a mating connector for each cable.

6. The apparatus according to claim 5 wherein said cable connector includes a memory module for storing said compensation values for said associated sensor.

7. The apparatus according to claim 1 wherein said plurality of sensor devices are located at a harsh location having extreme conditions of temperature wherein said electronic assembly could not operate and wherein said electronic assembly is located at a location remote from said harsh location to enable operation of said electronic assembly.

8. The apparatus according to claim 1 wherein said memory is located in said electronic assembly.

9. The apparatus according to claim 1 wherein said processing means includes a microcontroller having an internal memory for storing said compensation values for each sensor.

10. The apparatus according to claim 1 wherein each sensor has a separate memory associated therewith for storing said compensation coefficients associated with said sensor.

11. The apparatus according to claim 7 wherein said harsh location is a wind tunnel.

12. The apparatus according to claim 1 wherein said processor means outputs are coupled to a digital bus directed to a central computer.

13. The apparatus according to claim 6 wherein said memory module is an EEPROM.

14. The apparatus according to claim 11 wherein said wind tunnel includes a model with said sensor devices positioned on said model at various locations.

15. The apparatus according to claim 14 wherein said model is an airplane wing.

* * * * *